US005423203A

United States Patent [19]

Namiki et al.

[11] Patent Number: 5,423,203

[45] Date of Patent: Jun. 13, 1995

[54] FAILURE DETERMINATION METHOD FOR $O_2$ SENSOR

[75] Inventors: Koichi Namiki; Takuya Matsumoto; Toru Hashimoto, all of Kyoto; Yasuhisa Yoshida, Okazaki, all of Japan

[73] Assignee: Mitsubishi Jidosha Kogyo Kabushiki Kaisha, Tokyo, Japan

[21] Appl. No.: 92,527

[22] Filed: Jul. 16, 1993

[30] Foreign Application Priority Data

Jul. 16, 1992 [JP] Japan ................................. 4-189307

[51] Int. Cl.[6] ............................................ G01M 19/00

[52] U.S. Cl. ..................................... 73/1 G; 123/688; 73/118.1

[58] Field of Search ............... 73/1 G, 118.1; 123/688

[56] References Cited

U.S. PATENT DOCUMENTS

| | | | |
|---|---|---|---|
| 4,263,652 | 4/1981 | Heinrich | 73/1 G |
| 4,505,246 | 3/1985 | Nakajima et al. | 123/688 |
| 4,750,353 | 6/1988 | Wright et al. | 73/118.1 |
| 4,844,038 | 7/1989 | Yamata et al. | 123/688 |
| 4,933,863 | 6/1990 | Okano et al. | 123/688 |
| 5,027,646 | 7/1991 | Mizutani et al. | 73/118.1 |
| 5,179,929 | 1/1993 | Miyashita et al. | 123/688 |
| 5,212,947 | 5/1993 | Fujimoto et al. | 73/118.1 |
| 5,216,882 | 6/1993 | Kuroda et al. | 73/118.1 |
| 5,243,854 | 9/1993 | Ishida | 73/118.1 |
| 5,282,383 | 2/1994 | Kayanuma | 73/118.1 |

FOREIGN PATENT DOCUMENTS

| | | | |
|---|---|---|---|
| 3634873 | 4/1987 | Germany | 73/1 G |
| 31639 | 2/1986 | Japan | 123/688 |
| 200348 | 9/1986 | Japan | 123/688 |
| 75044 | 4/1987 | Japan | 123/688 |
| 157636 | 6/1990 | Japan | 123/688 |
| 3938 | 1/1991 | Japan | 123/688 |
| 23332 | 1/1991 | Japan | 123/688 |

OTHER PUBLICATIONS

Partial English Language Translation of Japanese Patent Document JP 3-23332 (cited above).

Japanese Utility Model Laid-Open Publication No. H2-54347, Apr. 19, 1990. (Partial English Language Translation Provided).

Japanese Patent Laid-Open Publication No. H4-16757, Jan. 21, 1992. (Partial English Language Translation Provided).

*Primary Examiner*—Hezron E. Williams

*Assistant Examiner*—Daniel S. Larkin

[57] ABSTRACT

A failure determination method for an $O_2$ sensor is provided wherein the air-fuel ratio of a mixture is maintained at a value which produces a leaner or richer air-fuel ratio than a stoichiometric ratio by a predetermined value, for a predetermined time after an engine starts operating in an idle region, to thereby make the oxygen concentration of exhaust gas surrounding the $O_2$ sensor uniform. Subsequently, the air-fuel ratio is forcibly subjected to an oscillatory change with a predetermined amplitude of ±10 to 15% of the stoichiometric ratio with respect to the stoichiometric ratio at a predetermined frequency of several Hz, to determine abnormality of the $O_2$ sensor based on the change of the output voltage of the $O_2$ sensor.

12 Claims, 5 Drawing Sheets

FAILURE DETERMINATION METHOD FOR $O_2$ SENSOR

BACKGROUND OF THE INVENTION

This invention relates to a failure determination method for an $O_2$ sensor which detects the oxygen concentration of exhaust gas from an internal combustion engine. More particularly, it relates to a failure determination method capable of accurately detecting performance degradation, disconnection, etc. of the $O_2$ sensor.

It is known in the art to arrange a three-way catalytic converter in an exhaust passage of an internal combustion engine installed in a motor vehicle, to remove harmful substances, such as CO, HC and $NO_x$ contained in the exhaust gas emitted from the engine. The three-way catalytic converter is advantageous in that a single catalyst can treat the three substances, i.e., CO, HC and $NO_x$, at the same time. However, to obtain the catalytic power of the three-way catalytic converter equally for the three substances at the same time, the air-fuel ratio of a mixture supplied to the engine must be controlled to a value falling within a range ($14.7\pm0.05$) of a air-fuel ratio. When carrying out air-fuel ratio feedback control of this type, information as to whether an actual air-fuel ratio of the mixture is rich or lean is required, and as typical measures, the oxygen concentration of the exhaust gas is detected as the information representing the actual air-fuel ratio. The oxygen concentration of the exhaust gas increases with an increase in the air-fuel ratio, and is detected by an $O_2$ sensor arranged in the exhaust passage on the upper-course side of the three-way catalytic converter. The air-fuel ratio control is carried out based on the result of the comparison between the $O_2$ sensor output representing the actual air-fuel ratio and the stoichiometric air-fuel ratio.

The $O_2$ sensor is arranged in the exhaust passage as mentioned above, and thus is exposed to high-temperature exhaust gas. Accordingly, the performance of the $O_2$ sensor may be degraded, or disconnection or an insulation defect may occur in the $O_2$ sensor. If such failure occurs in the $O_2$ sensor, the accuracy in detecting the oxygen concentration of the exhaust gas, which represents the actual air-fuel ratio, lowers, or the oxygen concentration itself cannot be detected, making it impossible to carry out proper air-fuel ratio control based on the output of the $O_2$ sensor. In such cases, it is difficult to control the air-fuel ratio to a value close to the stoichiometric ratio and to have the three-way catalytic converter function effectively. As a result, the exhaust gas cannot be purified satisfactorily.

To eliminate these drawbacks, various methods have been proposed for determining failure of the $O_2$ sensor. For example, in the description of prior art in Unexamined Japanese Patent Publication (KOKAI) No. 4-16757, a method is described in which degradation of the $O_2$ sensor is detected when the voltage amplitude of the $O_2$ sensor becomes smaller than a preset value during the air-fuel ratio control or when the control period of the air-fuel ratio control becomes greater than a preset value. In Unexamined Japanese Patent Publication No. 4-16757, when fuel cut is effected while the engine is operated with a rich air-fuel mixture, a response time, from the time the $O_2$ sensor output indicates mixture richness to the time it shifts to a lean side across a slice level, is measured. Degradation of the $O_2$ sensor is detected based on the result of the comparison between the response time and a diagnostic reference value which varies in dependence on the engine rotational speed, to thereby improve the determination accuracy. Further, Unexamined Japanese Utility Model Publication No. 2-54347 discloses an apparatus wherein the fuel injection quantity is set using a correction value including a particularly large proportional factor, such that the air-fuel ratio changes stepwise. A time elapsed from the discharge of gas, produced by the combustion of the thus-set quantity of fuel, from the cylinder until the output of an air-fuel ratio sensor crosses a slice level corresponding to the stoichiometric air-fuel ratio is measured. Finally, response degradation of the air-fuel ratio sensor is detected based on the result of the comparison between the measured time and a reference value.

However, improvement in the failure determination accuracy of $O_2$ sensors is still required.

OBJECTS AND SUMMARY OF THE INVENTION

One object of this invention is to provide a failure determination method for an $O_2$ sensor which is capable of accurately detecting performance degradation, disconnection, etc. of the $O_2$ sensor, to thereby prevent improper air-fuel ratio control attributable to failure of the $O_2$ sensor and to make the best use of the exhaust gas purifying capability of a three-way catalytic converter.

Another object of this invention is to provide a Failure determination method for an $O_2$ sensor which can detect sensor failure while preventing an increase of variation In the output torque of an engine, as well as an increase of the amount of exhaust gas from the engine.

According to this invention, there is provided a failure determination method for an $O_2$ sensor which detects oxygen concentration of an exhaust gas from an internal combustion engine. The failure determination method comprises the steps of: forcibly subjecting an air-fuel ratio of a mixture supplied to the internal combustion engine to an oscillatory change such that the air-fuel ratio alternately assumes, with an elapsed time, a first predetermined value which produces a richer air-fuel ratio than a stoichiometric air-fuel ratio and a second predetermined value which produces a leaner air-fuel ratio than the stoichiometric air-fuel ratio; detecting change of an output voltage of the $O_2$ sensor during the forced oscillatory change of the air-fuel ratio; and determining an abnormality of the $O_2$ sensor based on the detected change of the output voltage of the $O_2$ sensor.

Preferably, the air-fuel ratio is maintained at a third predetermined value which produces a richer or leaner air-fuel ratio than the stoichiometric ratio, for a predetermined period before the oscillatory change of the air-fuel ratio is started.

Still preferably, the step of maintaining the air-fuel ratio at the third predetermined value or the step of forcibly oscillating the air-fuel ratio is started only when the internal combustion engine is operating in a predetermined operating condition in which the amount of intake air for the engine is small, to thereby permit failure of the $O_2$ sensor to be determined.

Preferably, abnormality of the $O_2$ sensor is notified to the driver when it is judged that the operation of the $O_2$ sensor is abnormal.

This invention is advantageous in that it can determine the degree of response delay of the $O_2$ sensor with respect to the change of the air-fuel ratio, i.e., failure of the $O_2$ sensor, with reliability, by detecting a change of the output voltage of the $O_2$ sensor during the forced oscillatory change of the air-fuel ratio.

During the oscillatory change of the air-fuel ratio, changeover of the air-fuel ratio between rich and lean air-fuel ratios with respect to the stoichiometric ratio takes place a plurality of times. Thus, if there is a response delay of the $O_2$ sensor due to sensor abnormality, the response delay is accumulated during a plurality of changeovers of the air-fuel ratio, and the accumulated delay affects a change in the output voltage of the $O_2$ sensor. Accordingly, the method of this invention can accurately determine abnormality of the $O_2$ sensor, compared with a method wherein changeover of the air-fuel ratio is effected only once by, for example, shifting the engine operating condition from a rich air-fuel ratio region to a fuel-cut region or by purposely increasing the air-fuel ratio by a large margin, and wherein failure of the $O_2$ sensor is determined based on the degree of responsiveness of the $O_2$ sensor to the single changeover of the air-fuel ratio.

According to a particular mode of this invention wherein the air-fuel ratio is maintained at a rich or lean air-fuel ratio for a predetermined period before the oscillatory change of the air-fuel ratio is started, a preliminary process or preprocess is carried out prior to the air-fuel ratio oscillation or a substantial part of the failure determination process, to stabilize the oxygen concentration of exhaust gas surrounding the $O_2$ sensor, i.e., the output voltage of the sensor. By setting the rich or lean air-fuel ratio employed in the preprocess to a suitable value, the $O_2$ sensor output voltage can be reliably maintained at a rich or lean level immediately before the oscillatory change of the air-fuel ratio is started. Thus, it is possible to reliably produce a significant difference between the change of the output voltage of an abnormal $O_2$ sensor and that of a normal $O_2$ sensor, whereby the failure determination accuracy is improved.

Further, according to a particular mode of this invention wherein the failure determination is made only in a predetermined engine operating condition in which the amount of intake air is small, torque variation attributable to the air-fuel ratio oscillation for the failure determination can be suppressed because the engine output torque itself is small in such an operating condition. Furthermore, in the operating condition wherein the amount of intake air is small, the amount of exhaust gas can also be reduced.

According to a preferred mode of this invention wherein abnormality of the $O_2$ sensor is notified to the driver, it is possible to prevent the sensor failure from being left unnoticed, thus permitting prompt measures to be taken to remedy improper air-fuel ratio control and degraded exhaust-gas purifying effect of the three-way catalytic converter caused by the failure of the $O_2$ sensor.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION

Figure 1:
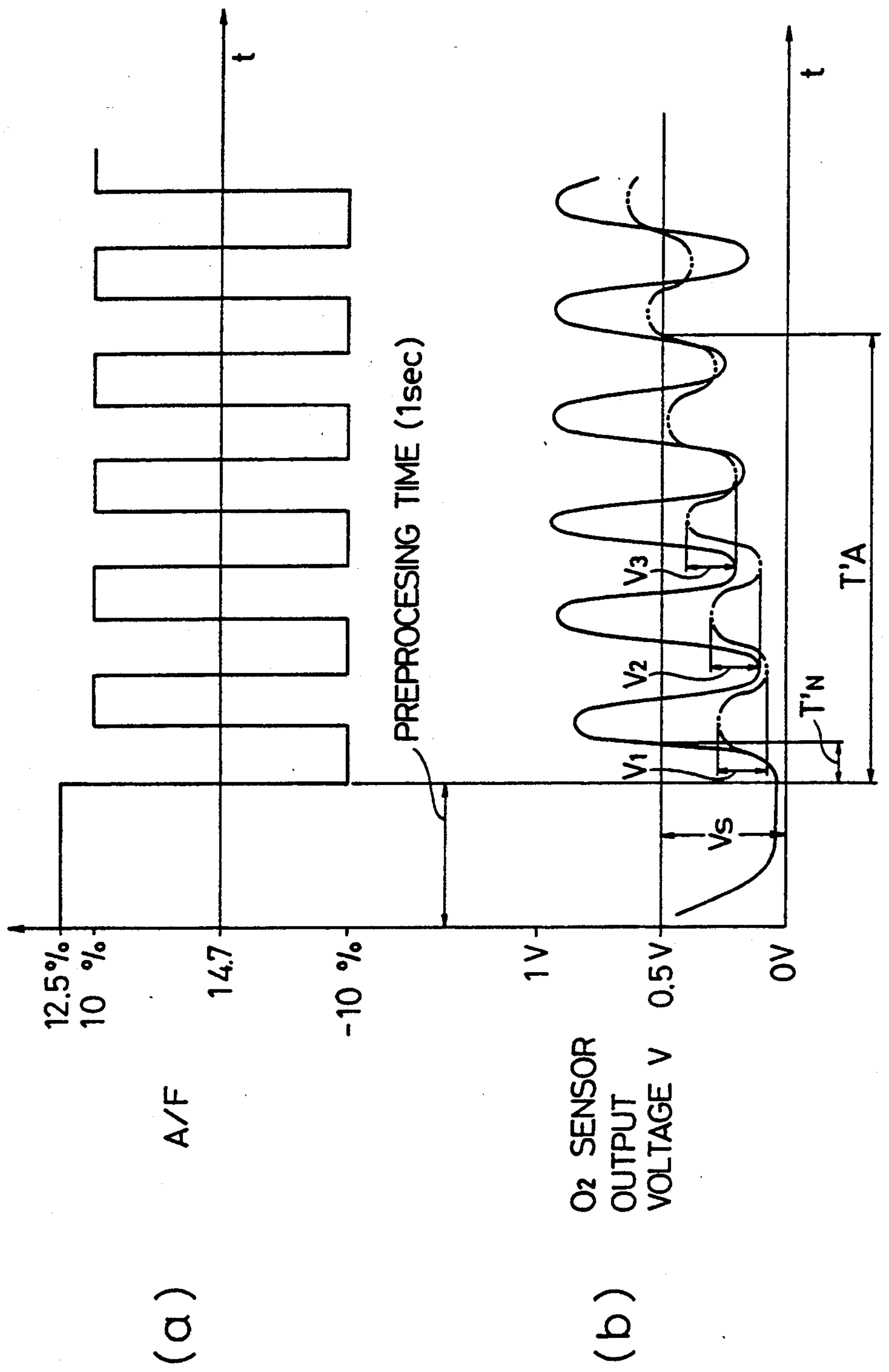
FIG. 1, graphs (a) and (b) show time-based change in air-fuel ratio and time-based changes in output voltage of normal and defective $0_2$ sensors, for illustrating an outline of a failure determination method according to this invention.

Referring to FIG. 1, the technical concept underlying a failure determination method for an $O_2$ sensor according to this invention will be described.

In a failure determination process according to the method of this invention, preferably it is first determined whether the engine is operating in a predetermined operation region or operating condition (e.g., an idle region) in which the intake air quantity is small. Only when the engine is operating in the predetermined region, a substantial part (process for a forced oscillation of the air-fuel ratio, described later) of the failure determination process, or a preprocess, mentioned later, executed prior to the determination process is started. This requirement for starting the failure determination process is intended to suppress variation in the output torque of the engine and to reduce the amount of exhaust gas. Namely, by permitting the failure determination process to be executed only in the predetermined engine operation region wherein the intake air quantity is small, that is, the engine output torque is small, torque variation, which may be caused by oscillatory change of the air-fuel ratio for failure determination as mentioned later, can be suppressed. Also, since the intake air quantity is small in the predetermined operation region, the amount of exhaust gas is small.

Subsequently, a preprocess (initialization process) is preferably executed to stabilize the oxygen concentration of exhaust gas surrounding the $O_2$ sensor, thereby stabilizing the output voltage of the $O_2$ sensor. In this preprocess, the air-fuel ratio is maintained at a rich or lean value for a predetermined time period. The rich or lean air-fuel ratio employed in the preprocess is set to a suitable value such that the output voltage of the $O_2$ sensor indicates a rich or lean level immediately before the substantial part of the failure determination process is started. The air-fuel ratio is set in this way in order to obtain a distinct difference between a change in the output voltage of an abnormal $O_2$ sensor (degree of responsiveness of the sensor to air-fuel ratio change) and that of a normal $O_2$ sensor, thereby enhancing the failure determination accuracy. In the preprocess shown in the left-hand part of FIG. 1, graph (a), the air-fuel ratio is maintained at a ratio which is 12.5% leaner than the stoichiometric ratio, for one second. As a result, the output voltage of the $O_2$ sensor is stabilized at a lean level, as indicated by the solid line in the left-hand part of FIG. 1, graph (b).

Next, a process for oscillatory change of the air-fuel ratio (forced oscillation or modulation of the air-fuel ratio) is started. In this process, the air-fuel ratio is forcibly subjected to an oscillation with an amplitude of, e.g., ±10 to 15% with respect to the stoichiometric ratio, at a frequency which is equal to or less than 10 Hz for a predetermined time period. In the example shown in FIG. 1, graph (a), the amplitude and frequency of the oscillation are ±10% and about 2 Hz, respectively. In this case, the air-fuel ratio alternately assumes, with elapse of time, a value which is 10% richer than the stoichiometric ratio and a value which is 10% leaner than the stoichiometric ratio, as shown in FIG. 1, graph (a). In other words, the air-fuel ratio shifts across the stoichiometric ratio from the rich side to the lean side and vice versa a plurality of times during execution of the oscillatory change process.

A typical $O_2$ sensor outputs a first voltage level of, e.g., about 0 V, when the air-fuel mixture is rich, and outputs a second voltage level of, e.g., about 1 V, when the air-fuel mixture is lean. When the $O_2$ sensor is operating normally, the output voltage of the $O_2$ sensor changes following a change of the air-fuel ratio; if the $O_2$ sensor is in abnormal condition, the output voltage does not faithfully follow a change of the air-fuel ratio.

Accordingly, when the air-fuel ratio is subjected to oscillatory change as shown in FIG. 1, graph (a), the $O_2$ sensor output voltage changes as indicated by the solid line in FIG. 1, graph (b) if the $O_2$ sensor is operating normally. If the $O_2$ sensor is in abnormal condition, the sensor output voltage changes as indicated by the two-dot chain line in FIG. 1, graph (b). As is clear from FIG. 1, graph (b), there is a significant difference between the change of output voltage of a normal $O_2$ sensor and that of an abnormal $O_2$ sensor. This is because the change in output voltage of an $O_2$ sensor during the oscillation of the air-fuel ratio indicates a degree of response delay of the $O_2$ sensor with respect to a plurality of changeovers of the air-fuel ratio. Thus, in the case where the $O_2$ sensor has a response delay due to failure, an accumulated response delay with respect to a plurality of changeovers of the air-fuel ratio appears in a change of the output voltage of the $O_2$ sensor.

Setting the amplitude and frequency of the oscillation of the air-fuel ratio to respective suitable values, as mentioned above, reliably produces a distinct difference between the change of output voltage of an abnormal $O_2$ sensor and that of a normal $O_2$ sensor, which is advantageous in the failure determination.

As described above, one of major features of this invention lies in that the air-fuel ratio is subjected to forced oscillation (modulation) to forcibly cause an oscillatory change of the air-fuel ratio, thereby producing a significant difference between output voltage change of a normal $O_2$ sensor and that of an abnormal $O_2$ sensor, whereby whether the $O_2$ sensor is operating normally or not can be reliably determined.

Further, it is determined whether the $O_2$ sensor is in abnormal condition, based on the change of output voltage of the $O_2$ sensor representing the degree of response delay of the sensor with respect to the air-fuel ratio change.

Specifically, while a plurality of oscillation cycles of the air-fuel ratio takes place after the start of the forced oscillation, an amplitude of the sensor output voltage in at least one oscillation cycle is detected as a parameter representing a change of the output voltage of the $O_2$ sensor. The detected amplitude of the $O_2$ sensor output voltage in at least one oscillation cycle Is compared with a predetermined voltage, to determine abnormality of the $O_2$ sensor.

Preferably, the amplitude of the $O_2$ sensor output voltage is detected in each of a plurality of oscillation cycles of the air-fuel ratio, an average value of the detected amplitudes is calculated as a parameter representing the change of output voltage of the $O_2$ sensor. Based on the result of the comparison between the average value and the predetermined voltage, it is determined whether the $O_2$ sensor is in abnormal condition. Consequently, the accumulated response delay of the $O_2$ sensor with respect to a plurality of oscillatory changes of the air-fuel ratio can be reliably detected, thus improving the accuracy in determining failure of the $O_2$ sensor.

In the example shown in FIG. 1, graph (b), amplitudes V1, V2 and V3 of the $O_2$ sensor output voltage in three oscillation cycles are detected, and an average value $\{(V1+V2+V3)/3\}$ of the detected amplitudes is calculated as a parameter representing the change of output voltage of the $O_2$ sensor. When the average value is smaller than a predetermined voltage Vs (e.g., 0.5 V), it is concluded that the $O_2$ sensor is in abnormal condition. Thus, it is possible to reliably detect an abnormal condition of the $O_2$ sensor which manifests itself as a reduced amplitude of the output voltage of the $O_2$ sensor.

In the case where the air-fuel ratio is maintained at a ratio richer than the stoichiometric ratio immediately before the start of oscillations of the air-fuel ratio, unlike the example of FIG. 1, graph (a), it is concluded that the $O_2$ sensor is in abnormal condition when an amplitude (or an average value of amplitudes) of the output voltage of the $O_2$ sensor is greater than the predetermined voltage Vs.

According to another mode of sensor abnormality determination, a time elapsed, from the start of oscillations of the air-fuel ratio until the output voltage of the $O_2$ sensor reaches the predetermined voltage Vs, is detected as a parameter representing the change of output voltage of the $O_2$ sensor. Further, when the detected time is longer than a predetermined time Ts, it is concluded that the $O_2$ sensor is in abnormal condition. In this case, it is possible to reliably detect an abnormal condition of the $O_2$ sensor which manifests itself as a degraded follow-up characteristic of the sensor output voltage with respect to changeover of the air-fuel ratio.

The predetermined time Ts is set to a time longer than (usually, slightly longer than) a time period T'N which a normal $O_2$ sensor generally requires before the output voltage thereof reaches the predetermined voltage Vs. If the $O_2$ sensor fails, a time T'A which the sensor requires before reaching the predetermined voltage Vs becomes longer than the predetermined time Ts.

When abnormality of the $O_2$ sensor is detected in the aforementioned manner, the sensor abnormality is notified to the driver. Thereby, situations where the failure of the $O_2$ sensor is left unnoticed can be avoided.

A failure determination method for $O_2$ sensor according to a first embodiment of this invention will be now described.

Figure 2:
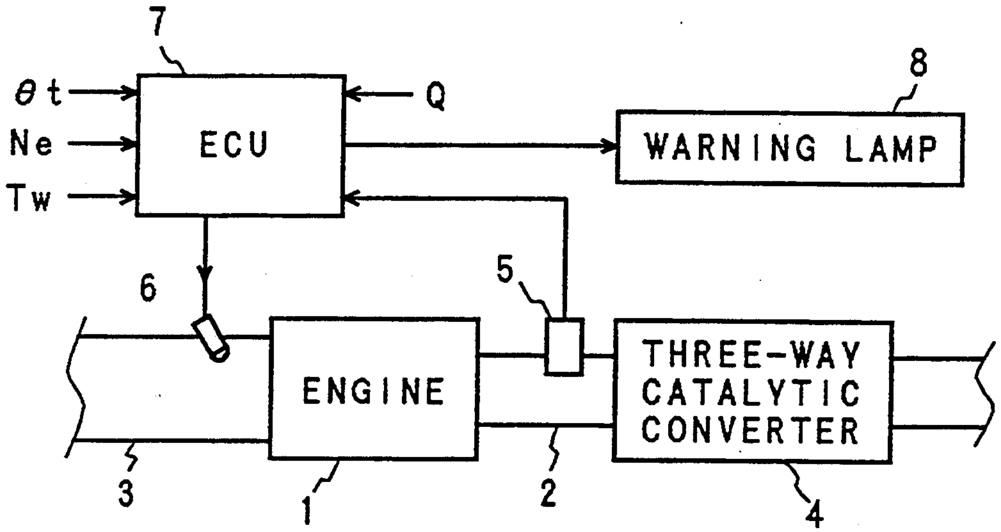
FIG. 2 is a diagram schematically illustrating, by way of example, a principal part of an air-fuel ratio control system for carrying out the failure determination method according to this invention.

FIG. 2 illustrates an air-fuel ratio control system for carrying out the method of this embodiment, wherein a three-way catalytic converter 4 is arranged in the middle of an exhaust passage 2 of an internal combustion engine 1, for removing CO, HC and $NO_x$ contained in the exhaust gas from the engine 1. On the upper-course side of the three-way catalytic converter 4 is arranged an $O_2$ sensor 5 for detecting the oxygen concentration of the exhaust gas.

Typically, the $O_2$ sensor 5 is composed of a zirconia tube (not shown) produced by baking a mixture of zirconium oxide and a small amount of yttrium oxide, and a protective tube (not shown) attached to a distal end of the zirconia tube. The atmosphere having a high oxygen concentration is introduced to the interior of the zirconia tube, while exhaust gas in the exhaust passage 2, having a low oxygen concentration, is introduced through the bore of the protective tube so as to surround the zirconia tube. Since the oxygen concentration of the atmosphere is constant, the difference in oxygen concentration between the inside and outside of the zirconia tube changes with the oxygen concentration of the exhaust gas. A porous platinum coating is formed on each of the inner and outer surfaces of the zirconia tube to function as an electrode and a catalyst.

When the air-fuel mixture supplied to the engine 1 is rich and the oxygen concentration of the exhaust gas is small, that is, when the oxygen concentration difference between the inside and outside of the zirconia tube is increased, the $O_2$ sensor 5 produces an electromotive force due to the catalytic effect of platinum. Conversely, when the air-fuel mixture contains a larger amount of oxygen and thus is lean, the oxygen concentration difference is small and the $O_2$ sensor produces no electromotive force. In order to achieve enhanced accuracy in detecting the oxygen concentration, the $O_2$ sensor 5 is situated at the confluence of exhaust gases from engine cylinders, on the immediate lower-course side of an exhaust manifold of the engine 1, and projects into the exhaust passage 2 so as to be at a right angle to the exhaust gas flow. Further, the $O_2$ sensor 5 is mounted at a position where it is prevented from being rapidly cooled by muddy water or the like and is free from a lowering of electrical insulation.

Reference numeral 7 denotes an electronic control unit (hereinafter referred to as "ECU"). To the input side of the ECU 7 are connected the $O_2$ sensor 5, an engine speed sensor for detecting the rotational speed Ne of the engine, a water temperature sensor for detecting the engine water temperature Tw, a throttle sensor for detecting the opening $\theta t$ of a throttle valve, and an airflow sensor for detecting the flow rate Q of intake air (none of these sensors are shown). The output side of the ECU 7 is connected to a fuel injection valve 6 arranged in an intake passage 3 of the engine 1, and a warning lamp 8.

The ECU 7 has a fuel injection quantity control function, namely, air-fuel ratio control function by which the fuel injection valve 6 is opened for a valve open time corresponding to the fuel injection quantity determined based on the output signals from the aforementioned various sensors. For example, when the engine 1 is operating in an air-fuel ratio feedback region, air-fuel ratio feedback control is executed based on the output of the $O_2$ sensor under the control of the ECU 7, such that the air-fuel ratio shifts to a stoichiometric air-fuel ratio region (window region) in which the three-way catalytic converter 4 effectively manifests its purifying effect. When the engine 1 is operating in a region other than the air-fuel ratio feedback region, the air-fuel ratio feedback control is canceled, and air-fuel ratio control is carried out such that the air-fuel ratio matches with various engine operating conditions such as engine start and acceleration. In the following description, the air-fuel ratio feedback control and the air-fuel ratio control executed when the feedback control is canceled are collectively referred to as normal air-fuel ratio control.

The ECU 7 has the function of determining failure of the $O_2$ sensor, such as performance degradation and disconnection of the sensor. Namely, the ECU 7 constitutes an essential part of the system for carrying out the $O_2$ sensor failure determination method according to this embodiment.

The failure determination process for the $O_2$ sensor, executed by the ECU 7, will now be described.

Figure 3:
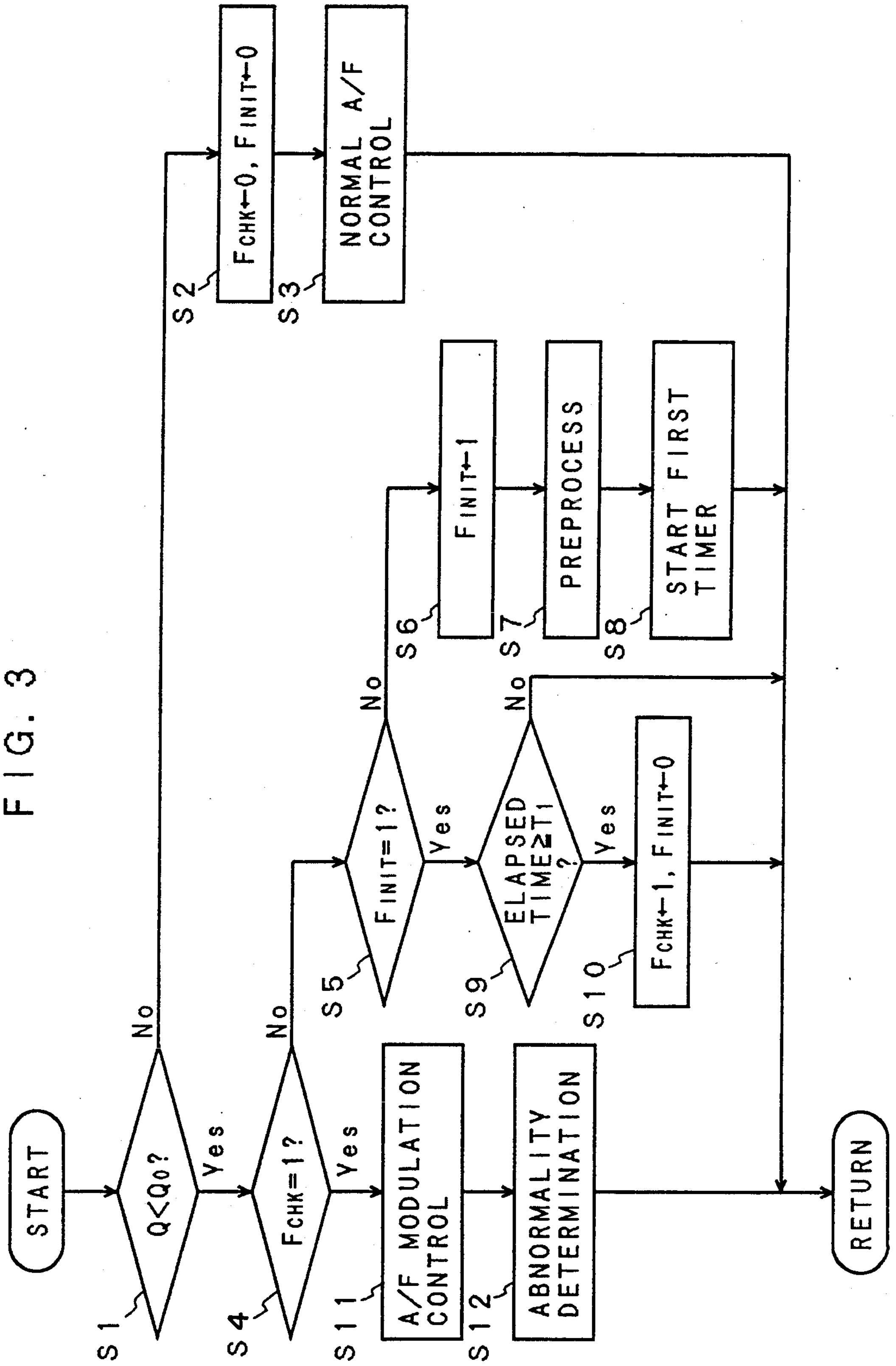
FIG. 3 is a flowchart of a process for determining failure of an $O_2$ sensor in a method according to a first embodiment of this invention.

After the engine 1 is started, the ECU 7 repeatedly executes the $O_2$ sensor failure determination process shown in FIG. 3. Specifically, in each of the determination cycles, the ECU 7 first determines based on the output Q of the flow sensor whether the flow rate Q of air supplied to the engine is smaller than a predetermined value Q0 (Step S1). If NO in Step S1, i.e., if the engine is not operating in an idle region, the ECU 7 resets a check flag $F_{CHK}$ to "0", which value indicates that the $O_2$ sensor failure determination is not being executed, resets an initial flag $F_{INIT}$ to "0", which indicates that the preprocess is not under execution (Step S2), and then carries out the normal air-fuel ratio control (Step S3). Thus, execution of the failure determination process is substantially prohibited in an engine operation region other than the idle region.

Steps S1 to S3 are repeatedly executed thereafter. When the operating condition of the engine 1 has shifted to the idle region (YES in Step S1), the ECU 7 judges that execution of the failure determination process is allowed, and determines whether the value of the check flag $F_{CHK}$ is "1" which indicates that the failure determination is under execution (Step S4). Immediately after the failure determination process is started, the decision in Step S4 provides the answer NO. Thereafter, the ECU 7 determines whether the value of the initial flag $F_{INIT}$ is "1" which indicates that the preprocess is under execution (Step S5). The decision in Step S5 also provides answer NO immediately after the failure determination process is started. Accordingly, the ECU 7 sets the initial flag $F_{INIT}$ to "1" (Step S6), and starts the preprocess for maintaining the air-fuel ratio A/F at a value (FIG. 1, graph (a) which is, for example, 12.5% leaner than the stoichiometric air-fuel ratio (Step S7). To this end, the ECU 7 halts the normal air-fuel ratio control, and then controls the fuel injection valve 6 to open the same for a time period calculated based on the output Ne of the engine speed sensor, the output Q of the flow sensor, and the target lean air-fuel ratio set in the preprocess. Subsequently, the ECU 7 sets a predetermined preprocessing time $T_1$, e.g., one second (FIG. 1, graph (a), in a first timer (not shown) which comprises, e.g., a down-counter, for measuring the time elapsed from the start of the preprocess, and starts the first timer (Step S8). Then, the present cycle of the failure determination process ends and the flow returns to Step S1.

In the subsequent process cycle and the succeeding cycles, Steps S1, S4, S5 and S9 are repeatedly executed as long as the engine continues operating in the idle region. Namely, during execution of the preprocess, the decision in Step S4 always provides answer NO and the decision in Step S5 always provides answer YES. Accordingly, the ECU 7 determines in Step S9 whether the value of the first timer has been reduced to "0", thereby determining whether the time elapsed from the start of the preprocess, measured by the first timer, has reached the predetermined time $T_1$.

When it is concluded thereafter in Step S9 that the predetermined preprocessing time $T_1$ has passed, the ECU 7 resets the initial flag $F_{INIT}$ to "0" which indicates completion of the preprocess, and sets the check flag $F_{CHK}$ to "1" which indicates that checking (abnormality determination) of the $O_2$ sensor 5 is under execution (Step S10). Since, in the preprocess, the air-fuel ratio is controlled to the target lean air-fuel ratio, the output voltage of the $0_2$ sensor upon completion of the preprocess is at a level close to 0 V, corresponding to the lean air-fuel ratio (FIG. 1, graph (b).

If in Step S1 of the subsequent cycle, it is concluded that the engine 1 is still operating in the idle region, the ECU 7 judges that the value of the check flag $F_{CHK}$ is "1" in Step S4, and then initiates air-fuel ratio modulation control (forced oscillation control) for determining abnormality of the $O_2$ sensor (Step S11). To this end, the ECU 7 halts the control of the air-fuel ratio to the target lean air-fuel ratio, and successively calculates first and second target values respectively corresponding to a first target air-fuel ratio (FIG. 1, graph (a) for the modulation control, which is, for example, 10% richer than the stoichiometric ratio, and a second target air-fuel ratio (FIG. 1, graph (a) for the modulation control, which is, for example, 10% leaner than the stoichiometric ratio. Next, the ECU 7 opens the fuel injection valve 6 for a time period corresponding to the first target value. Then, In Step S12, the ECU 7 executes an abnormality determination subroutine shown in detail in FIG. 4.

In the subsequent cycle and the succeeding cycles, Steps S1, S4, S11 and S12 are repeatedly executed as long as the engine continues operating in the idle region, whereby the air-fuel ratio modulation control is carried out. During the air-fuel ratio modulation control, the ECU 7 sets the valve open time such that the valve open time alternately assumes the first and second target values at a frequency of about 2 Hz (FIG. 1, graph (a), to thereby control the fuel injection valve 6 with the thus-set valve open times. As a result, the air-fuel ratio undergoes an oscillatory change with an amplitude of $\pm 10\%$ with respect to the stoichiometric air-fuel ratio at a frequency of about 2 Hz, as shown in FIG. 1, graph (a).

Figure 4:
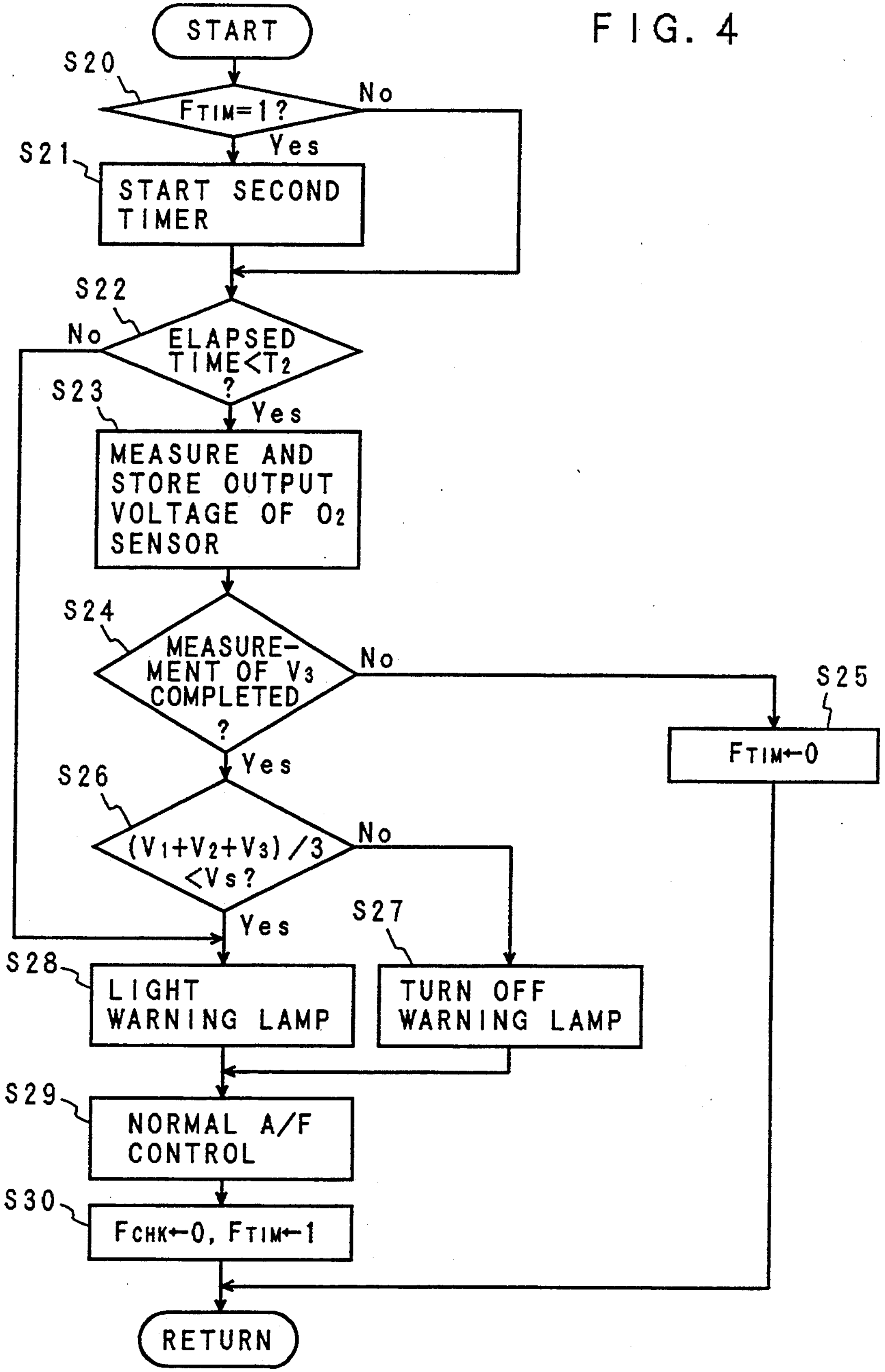
FIG. 4 is a flowchart showing details of an abnormality determination subroutine shown in FIG. 3.

Referring now to FIG. 4 illustrating the abnormality determination subroutine, the ECU 7 determines whether the value of a timer flag $F_{TIM}$ is "1" which value indicates that measurement of the output voltage of the $O_2$ sensor is not yet started (Step S20). Immediately after the abnormality determination subroutine is started, the timer flag $F_{TIM}$ is set at an initial value of "1", and thus the decision in Step S20 provides answer YES. Accordingly, the ECU 7 sets a modulation control execution time $T_2$ in a second timer (not shown) which measures the time elapsed from the start of the air-fuel ratio modulation control, and then starts the second timer (Step S21).

Subsequently, the ECU 7 determines, referring to the second timer, whether the modulation control execution time $T_2$ is still longer than the elapsed time (Step S22), and if YES in Step S22, measures the output voltage of the $O_2$ sensor (Step S23). In Step S23, the ECU 7 compares the measured output voltage of the $O_2$ sensor with the output voltage values successively measured from the start of the air-fuel ratio modulation control up to the present cycle, to determine maximum and minimum output voltage values. When determining a minimum output voltage value of the $O_2$ sensor, the ECU 7 calculates and stores the difference between this minimum value and a maximum value measured preceding the minimum value in a memory device (not shown) as an amplitude Vi of the output voltage of the $O_2$ sensor, and also stores data representing a number of measurement of this amplitude Vi from the start of the modulation control in the memory device.

Then, in Step S24, the ECU 7 determines whether measurement of the third amplitude V3 is completed, and if NO in Step S24, resets the timer flag $F_{TIM}$ to "0" which indicates that the $O_2$ sensor output voltage is being measured (Step S25).

In the next and the following cycles, Steps S1, S4, S11 and S12 of the main routine in FIG. 3 are repeatedly executed as long as the engine continues operating in the idle region. In the subroutine of FIG. 4 (corresponding to Step S12), Steps S20, S22 and S23 to S25 are successively executed. As a result, the amplitudes V1, V2 and V3 of the $O_2$ sensor output voltage are measured in succession.

If in Step S24 of a later process cycle, it is concluded that the measurement of the third amplitude V3 of the $O_2$ sensor output voltage is completed, the ECU 7 computes an arithmetic mean value $(V1+V2+V3)/3$ of the amplitudes V1 and V2 previously measured and stored and the presently measured amplitude V3 of the $O_2$ sensor output voltage, and determines whether the mean value is smaller than the predetermined voltage Vs (Step S26). If NO in Step S26, the ECU 7 judges that the $O_2$ sensor 5 is operating normally, and turns off the warning lamp 8 (Step S27).

If YES in Step S26, that is, if the arithmetic mean $(V1+V2+V3)/3$ of the output voltage amplitudes V1, V2 and V3 of the $O_2$ sensor 5 is smaller than the predetermined voltage Vs, the ECU 7 Judges that the $0_2$ sensor 5 has failed, and lights the warning lamp 8 to notify the driver of the failure (Step S28).

In the case where the decision in Step S22 provides answer NO, that is, if the air-fuel ratio modulation control period $T_2$ passes before measurement of the third amplitude V3 of the $O_2$ sensor output voltage is completed, the ECU 7 Judges that the $O_2$ sensor 5 is in abnormal condition, assuming that the arithmetic mean of the output voltage amplitudes of the $O_2$ sensor 5 failed to reach the predetermined value Vs within the time period $T_2$. In this case, the ECU 7 lights the warning lamp 8 (Step S28).

After completing the $O_2$ sensor abnormality determination in this manner, the ECU 7 halts the air-fuel ratio modulation control in Step S29 executed following Step S27 or S28, and then resumes the normal air-fuel ratio control. Further, the ECU 7 resets the check flag $F_{CHK}$ to "0" which indicates termination of the $O_2$ sensor abnormality determination, and resets the timer flag $F_{TIM}$ to "1" which indicates that the output voltage of the $O_2$ sensor is not being measured (Step S30). Thus, the failure determination process of FIGS. 3 and 4 is ended.

An $O_2$ sensor failure determination method according to a second embodiment of this invention will be now described.

Unlike the first embodiment wherein abnormality of the $O_2$ sensor Is determined based on the mean value $\{(V1+V2+V3)/3\{$ of the output voltage amplitudes measured in respective three cycles of air-fuel ratio oscillation, in this embodiment, sensor abnormality is determined based on the time period which the $O_2$ sensor requires until the output voltage thereof reaches the predetermined value Vs.

Figure 5:
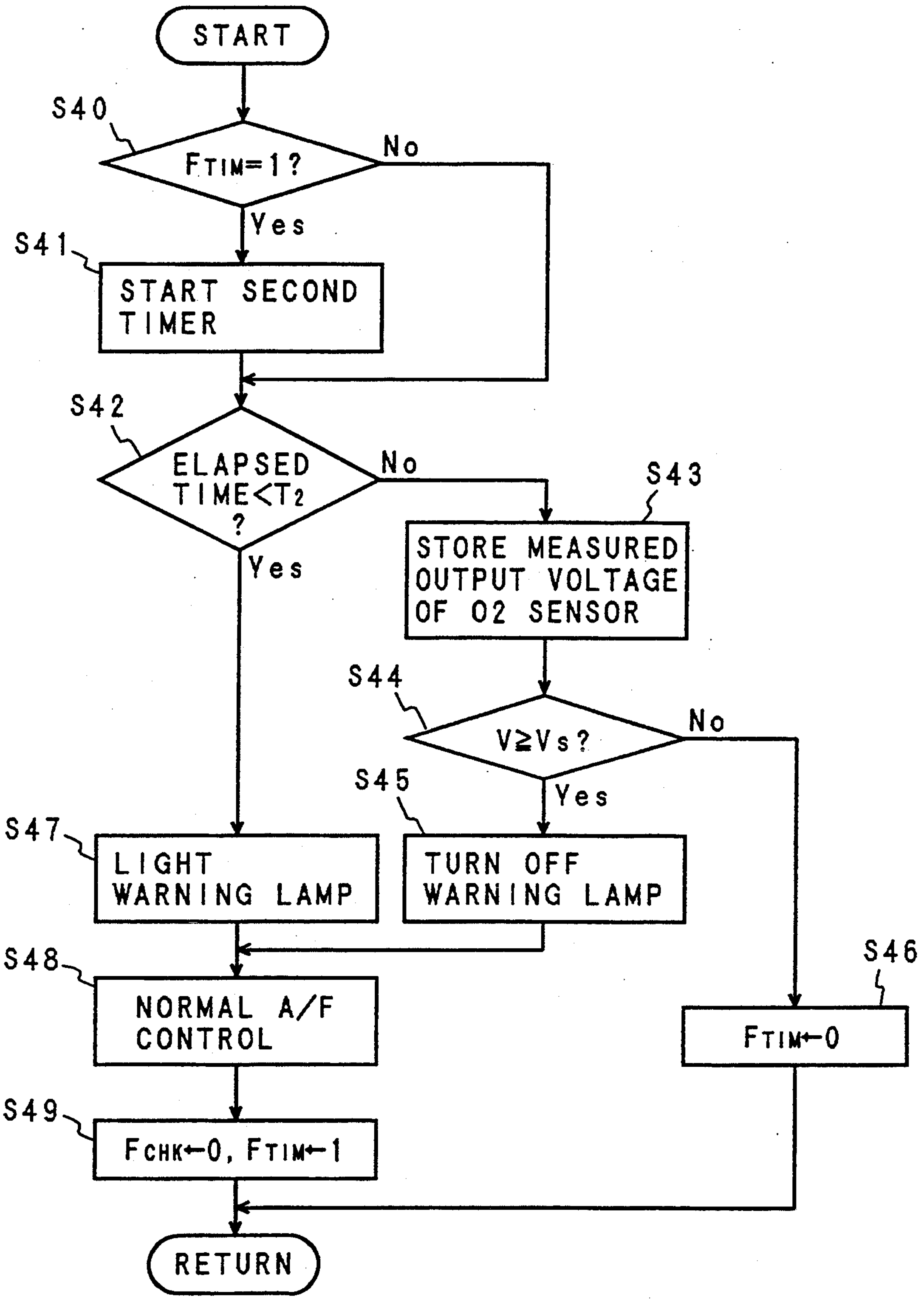
FIG. 5 is a flowchart showing details of an abnormality determination subroutine in a failure determination method according to a second embodiment of this invention.

The method of the second embodiment can be implemented with the system shown in FIG. 2, and thus a description of the system is omitted. Further, the sensor failure determination process of the second embodiment is basically identical with that of the first embodiment, and the main routine shown in FIG. 3 is executed. However, instead of the subroutine of FIG. 4, an abnormality determination subroutine shown in FIG. 5 is executed. The following is a description of the abnormality determination subroutine, wherein explanation of the steps similar to those in FIG. 4 is partly omitted in FIG. 5.

Referring to FIG. 5 illustrating the $O_2$ sensor abnormality determination subroutine (corresponding to Step S12 in the main routine of FIG. 3), the ECU 7 first judges that the timer flag $F_{TIM}$ is set at the initial value "1", in Step S40 corresponding to Step S20 in FIG. 4. Then, the ECU 7 starts the second timer to measure the time elapsed from the start of the air-fuel ratio modulation control, in Step S41 corresponding to Step S21 in FIG. 4, and determines, referring to the second timer, whether the time elapsed from the start of the modulation control is longer than or equal to the predetermined time $T_2$ (corresponding to the predetermined time Ts in FIG. 1, graph (b) (Step S42).

Immediately after the start of the modulation control, the decision in Step S42 provides answer NO. In this case, the ECU 7 measures the output voltage V (FIG. 1, graph (b)) of the $O_2$ sensor 5 (Step S43), and determines whether the output voltage V is higher than or equal to the predetermined voltage Vs (e.g., 0.5 V) (Step S44). If NO in Step S44, the ECU 7 resets the timer flag $F_{TIM}$ to "0" which value indicates that the $O_2$ sensor output is being measured (Step S46), and the present cycle of the abnormality determination process of FIG. 5 ends.

The abnormality determination process of FIG. 5 (i.e., Step S12 in FIG. 3) is repeatedly executed as long as the engine 1 continues operating in the idle region, and in the subsequent and the following cycles of the abnormality determination process, Steps S40, S42 to S44 and S46 are repeatedly executed unless the predetermined time $T_2$ is reached. If it is concluded in Step S44 of a later cycle that the output voltage V of the $O_2$ sensor 5 has become higher than or equal to the predetermined value Vs before the predetermined time $T_2$ passes, the ECU 7 Judges that the $O_2$ sensor 5 is operating normally, and turns off the warning lamp 8 (Step S45).

On the other hand, if the predetermined time $T_2$ elapses before the output voltage V of the $O_2$ sensor reaches the predetermined value Vs, the decision in Step S42 provides answer YES. In this case, the ECU 7 judges that the $O_2$ sensor 5 is in an abnormal state, and lights the warning lamp 8 (Step S47).

In Step S48 executed following Step S45 or S46, the ECU 7 halts the air-fuel ratio modulation control, and starts the normal air-fuel ratio control (Step S48). Further, the ECU 7 resets the check flag $F_{CHK}$ to "0" and sets the timer flag $F_{TIM}$ to "1" (Step S49).

This invention is not limited to the first and second embodiments described above, and various modifications may be made.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

In both of the embodiments described above, the air-fuel ratio is maintained at a ratio leaner than the stoichiometric ratio in the preprocess preceding the air-fuel ratio modulation control, but the air-fuel ratio may alternatively be maintained at a rich air-fuel ratio. Further, the preprocess is not essential to the method of this invention.

In the first and second embodiments, the $O_2$ sensor failure determination process is executed only when the engine is operating in the idle region. Alternatively, the failure determination process may be executed only in an engine operation region wherein the amount of intake air is small, other than the idle region. However, to prohibit execution of the failure determination process in an engine operation region other than the predetermined region such as the idle region is not an indispensable part of the method of this invention.

Although in the first embodiment, failure of the $O_2$ sensor is determined based on the mean value of sensor output voltage amplitudes measured in three (more generally, a plurality of) cycles of air-fuel ratio oscillation, the failure determination procedure can be modified in various ways. For example, while a plurality of cycles of air-fuel ratio oscillation take place, sensor abnormality may be determined based on the amplitude of the output voltage of the $O_2$ sensor measured in at least one oscillation cycle (e.g., the second or third cycle.)

Further, the sensor abnormality determination procedures of the first and second embodiments may be combined.

What is claimed is:

1. A failure determination method for an $O_2$ sensor which detects oxygen concentration of an exhaust gas from an internal combustion engine, comprising the steps of:

(a) maintaining an air-fuel ratio of a mixture supplied to the internal combustion engine at a rich or lean value, with respect to a stoichiometric air-fuel ratio, for a first predetermined time period;

(b) forcibly subjecting the air-fuel ratio to an oscillatory change such that the air-fuel ratio alternately varies between a rich value with respect to the stoichiometric air-fuel ratio and a lean value with respect to the stoichiometric air-fuel ratio after a lapse of said first predetermined time period;

(c) detecting change of an output voltage of the $O_2$ sensor during the forcibly subjected oscillatory change of the air-fuel ratio; and (d) determining abnormality of the $O_2$ sensor based on the detected change of the output voltage of the $O_2$ sensor.

2. A failure determination method according to claim 1, wherein said step (a) of maintaining the air-fuel ratio is started upon detecting operation of the internal combustion engine in a predetermined operating condition in which an amount of intake air for the internal combustion engine is below a predetermined value.

3. A failure determination method according to claim 1, wherein said step (d) of determining abnormality of the $O_2$ sensor comprises the substeps of:

(1) detecting a time period elapsed from a start of the oscillatory change of the air-fuel ratio until the output voltage of the $O_2$ sensor reaches a predetermined voltage value, as a parameter representing the change of the output voltage of the $O_2$ sensor; and (2) judging that operation of the $O_2$ sensor is abnormal when the detected elapsed time period is longer than a predetermined time period.

4. A failure determination method according to claim 1, wherein the forcibly subjected oscillatory change of the air-fuel ratio in step (b) is carried over a time period which is shorter than the first predetermined time period of step (a).

5. A failure determination method according to claim 1, wherein an air-fuel ratio set in step (a) is different from the rich air-fuel ratio and the lean air-fuel ratio varied between in step (b).

6. A failure determination method according to claim 4, wherein said step (b) of forcibly subjecting the air-fuel ratio to an oscillatory change is started upon detecting operation of the internal combustion engine in a predetermined operating condition in which an amount of intake air for the internal combustion engine is below a predetermined value.

7. A failure determination method according to claim 6, wherein said predetermined operating condition comprises an idle operating condition.

8. The failure determine method of claim 4, wherein said step (b) of forcibly subjecting oscillatory change to the air-fuel ratio includes subjecting the air-fuel ratio to an oscillatory change with a predetermined amplitude at a predetermined frequency over a second predetermined time period.

9. A failure determination method according to claim 8, wherein said predetermined amplitude is $\pm 10$ to 15% with respect to the stoichiometric air-fuel ratio, and said predetermined frequency is smaller than 10 Hz.

10. A failure determination method according to claim 4, wherein said step (d) of determining abnormality of the $O_2$ sensor comprises the substeps of:

(1) detecting an amplitude value of the output voltage of the $O_2$ sensor in at least one cycle of oscillation of the air-fuel ratio during a time period from a start of the oscillatory change to a time when a plurality of cycles of oscillation of the air-fuel ratio are completed, as a parameter representing the change of the output voltage of the $O_2$ sensor; and (2) determining abnormality of the $0_2$ sensor based on a result of a comparison between the detected amplitude value of the output voltage of the $0_2$ sensor in said at least one cycle of oscillation and a predetermined voltage value.

11. A failure determination method according to claim 10, wherein abnormality of the $O_2$ sensor is determined in step (d) by detecting the amplitude value of the output voltage of the $O_2$ sensor In each of said plurality of cycles of oscillation, calculating a mean value of the detected amplitude values as a parameter representing the change of the output voltage of the $O_2$ sensor, and comparing the calculated mean value with the predetermined voltage value.

12. A failure determination method according to claim 4, which further comprises a step (e) of notifying abnormality of the $O_2$ sensor to a driver when abnormality of the $O_2$ sensor is determined in step (d).

* * * * *